United States Patent Office 3,649,602
Patented Mar. 14, 1972

3,649,602
COPOLYAMIDES FROM DODECANE DIOIC ACID, HEXAMETHYLENE DIAMINE, m- AND p-XYLYLENE DIAMINE
Yoshizo Tsuda, Akinori Yamamoto, and Kozyuro Ikeda, Otsu-shi, Japan, assignors to Toray Industries, Inc., Tokyo, Japan
Filed Sept. 4, 1969, Ser. No. 855,125
Claims priority, application Japan, Sept. 9, 1968, 43/64,328; Apr. 28, 1969, 44/33,072
Int. Cl. C08g 20/20
U.S. Cl. 260—78 R                      2 Claims

ABSTRACT OF THE DISCLOSURE

A novel class of copolyamides is provided which is synthesized from a mixture consisting of (a) 45–90% by weight of paraxylylene dodecane·dioic acid diamide, (b) 10–45% by weight of metaxylylene dodecane·dioic acid amide and (c) 0–45% by weight of hexamethylene dodecane·dioic acid amide. The copolyamides of this invention are especially valuable when manufactured into fibers.

BACKGROUND OF THE INVENTION

(1) Field of the invention

This invention relates to a novel class of copolyamides and fibers produced therefrom having a high degree of crystallinity, an increased Young's modulus and improved dimensional stability and to the process for the preparation thereof.

(2) Description of the prior art

It has heretofore been suggested for the purpose of increasing the initial Young's modulus of polyamide fibers to include in the polymerization mixture reactants having aromatic rings. For example, polyamides have been suggested which are obtained by condensing metaxylylene diamine or paraxylylene diamine with various kinds of aliphatic dicarboxylic acids having 6–10 carbon atoms. The polyamides in which metaxylylene diamine was employed exhibited a low Young's modulus when wet out at temperatures slightly above room temperature. Because of their poor hot wet strength this class of polyamides have not been utilized to any extent. The polyamides obtained from paraxylylene diamine had a melting point above 270° C. Accordingly, the polymerization and spinning of this class of polyamides had to be conducted at elevated temperatures which caused problems of gelation and discoloration.

Isomorphous copolymerization methods are known which cause a lowering of the melting point of the copolymer while retaining a high degree of crystallinity, both of which are necessary for synthetic fiber applications. Isomorphoric copolyamides are also known which are obtained by polymerizing a mixture of paraxylylene diamine and metaxylylene diamine with aliphatic dicarboxylic acids having 6–10 carbon atoms. Copolymers wherein the molar ratio of the metaxylylene diamine is larger than that of the paraxylylene diamine have been described. However, no disclosure has been made of copolyamides of this type wherein dodecane dioic acid was employed. Nothing is known about textile properties of the polyamide fibers melt spun from such isomorphous copolymers. With regard to isomorphous copolymerization, it should be noted that there are various degrees of isomorphous replacement which can cause differences in retention of crystallinity, and a difference in the dimensional stability of drawn yarns. The exact effect of a change in isomorphous replacement on the properties of yarn have not been disclosed.

SUMMARY OF THE INVENTION

It has been found that copolyamides comprised of 45–90% by weight paraxylylene dodecane·dioic acid amide, 10–45% by weight of metaxylylene dodecane·dioic acid amide and 0–45% by weight of hexamethylene dodecane·dioic acid amide have melting points sufficiently low for spinning of fibers. The fibers produced from these polyamides exhibit a low boiling water shrinkage, high tensile strength, a high initial Young's modulus, as well as good dyeability with acidic dyestuffs. Because of their high degree of crystallinity, the fibers also have excellent heat setting properties.

DESCRIPTION OF THE PREFERRED EMBODIMENTS

Polyamides consisting mainly of paraxylylene dodecane·dioic acid amide have melting points of about 273° C. which is too high to allow the polymer to melt and flow. At ordinary melt polymerization temperature, the polymers tend to gel and discolor. Furthermore, it is difficult to raise the tensile strength of a drawn yarn above 3 g./d. However, when metaxylylene diamine which can form isomorphous copolymers is mixed with paraxylylene diamine and the mixture polymerized with dodecane dioic acid, the copolyamide paraxylylene dodecane·dioic acid amide/metaxylylene dodecane·dioic acid amide is obtained which has good crystallinity and a melting point of 200–265° C. When this copolymer is melt spun, filaments having a high degree of orientation are obtained which have a tensile strength in excess of 3 g./d. As compared with known copolyamides for example paraxylylene diamine-sebacic acid/metaxylylene diamine-sebacic acid, the polyamide fibers exhibit remarkably good dimensional stability. Further, in addition to metaxylylene diamine and para-xylylene diamine, hexamethylene diamine can optionally be added to form a ternary amine mixture which when polymerized with dodecane·dioic acid forms terpolymer (paraxylylene dodecane·dioic acid amide/metaxylylene dodecane·dioic acid amide/hexamethylene dodecane·dioic acid amide). It has been found that these terpolymers also have good crystallinity and a melting point of 200–265° C. and polyamide filaments obtained by melt spinning have a high degree of orientation, a high tensile strength, a high Young's modulus and good dimensional stability.

Figure 1:
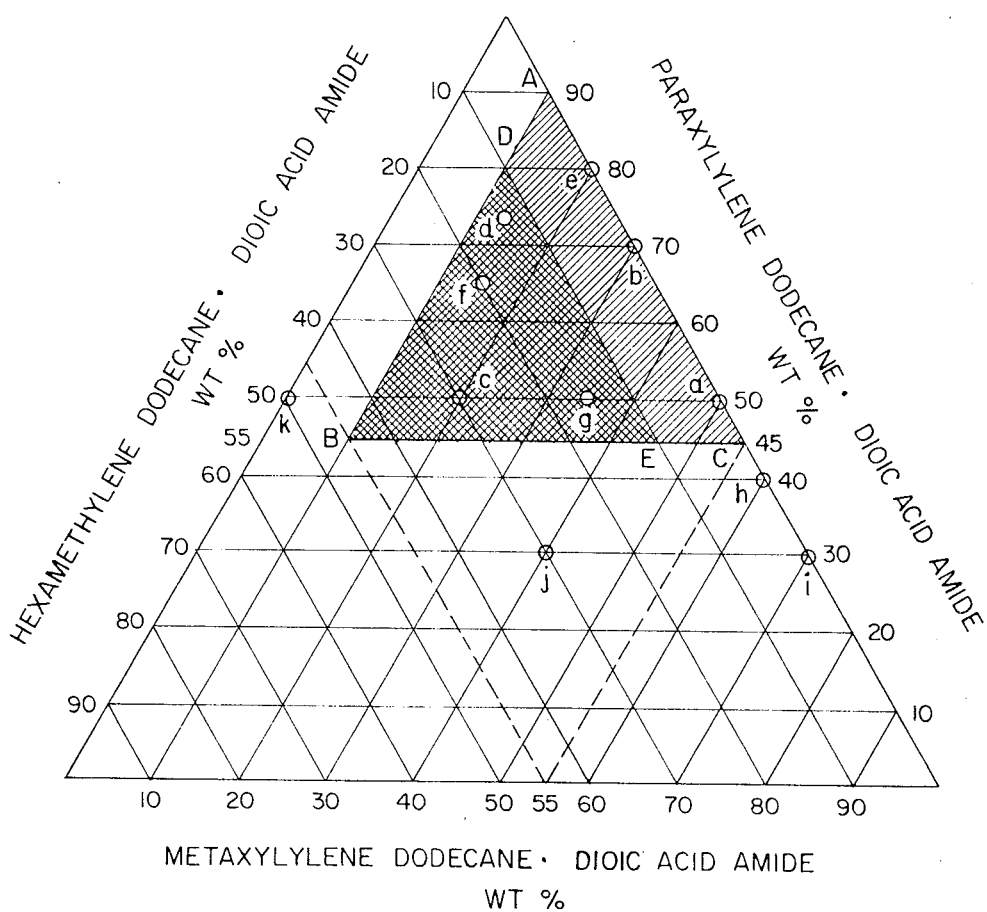
FIG. 1 is a triaxial graph showing the copolyamide compositions included within the scope of the present invention.

More specifically the copolyamide fibers which have a composition with the zone ABC of FIG. 1 exhibit a little shrinkage in boiling water, high tensile strength and a high initial Young's modulus. The fibers are readily dyed with acid dyestuff. Because of the fiber of excellent crystallinity the fibers are also excellent in their heat setting properties. Woven fabric having improved dimensional stability can be obtained using the polyamides of this invention. In addition, textured yarns can be prepared by false twisting. It is also possible to produce a textured yarn having good crimping characteristics by preparing a conjugate fiber or mix spinning or mix weaving filaments or staple fibers of this invention with another polymer having a high heat shrinkage, preferably a polyamide fiber, using the polyamide of this invention as the low shrinking component or filaments.

The preferable copolyamide fibers of the present invention are synthesized from a mixture of polyamide salts wherein the ratio of the three components, paraxylylene dodecane·dioic acid amide salt, metaxylylene dodecane·dioic acid amide salt and hexamethylene dodecane·dioic acid amide salt is within the triangle defined by connecting point A, B and C in FIG. 1. The point A defies a composition whose ratio in percent by weight of paraxylylene dodecane·dioic acid amide salt, metaxylylene dodecane·dioic acid amide salt and hexamethylene dodecane·dioic acid amide salt is 90/10/0. Similarly the point B defines a composition whose ratio is 45/10/45 and the point C defines a composition whose ratio is 45/55/0.

In FIG. 1, all copolymers whose composition is within the range of a triangle ABC have good crystallinity, a melting point within the range of 200–265° C., good heat stability and are easily melt spun. The copolymers wherein the ratio of the metaxylylene dodecane·dioic acid amide salt is larger than the percentage represented by the line BC have a melting point of less than 200° C., and are therefore unsuitable for fiber. The copolymers wherein the component ratio of hexamethylene dodecane·dioic acid amide salt is larger than the percentage represented by line BC, are also unsuitable having low glass transition temperature and accordingly a low initial Young's modulus.

The introduction of paraxylylene dodecane·dioic acid amide causes the initial (Young's) modulus to increase. The preferred compositions are included in the range defined by the triangle DBE in FIG. 1, wherein the point D defines a composition having a ratio in percent by weight of paraxylylene dodecane·dioic acid amide salt, metaxylylene dodecane·dioic acid amide salt and hexamethylene dodecane·dioic acid amide salt of 80/10/10 and similarly the point E defines a composition having a ratio of 45/45/10.

Another characteristic possessed by the copolymer's composition included within the triangle ABC in FIG. 1 is that it is easier to draw the filament obtained from the said copolymers. Accordingly, drawn yarns having a high tensile strength and a high initial Young's modulus can be obtained. This ease of draw is at its optimum when the content of paraxylylene dodecane·dioic acid amide salt is 50–80%. The larger component ratio of paraxylylene dodecane·dioic acid amide, the more difficult it is to draw the copolymer and when paraxylylene dodecane·dioic acid amide salt is used alone, that is paraxylylene dodecane·dioic acid amide homopolymer, it is almost impossible to draw the fibers and obtain fibers having a tensile strength above 3 g./d.

Figure 2:
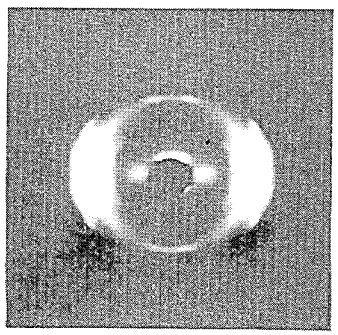
FIG. 2 is a photograph of a wide angle X-ray diffraction pattern of a copolyamide fiber included within the scope of this invention.
Figure 3:
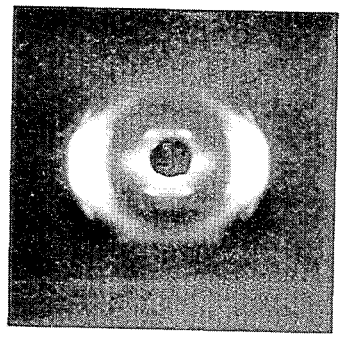
FIG. 3 is an additional photograph of a wide angle X-ray diffraction pattern of an additional copolyamide fiber included within the scope of the present invention.

The copolyamide fibers of the present invention when drawn have a high degree of crystallinity as is shown in the wide angle X-ray photographs in FIGS. 2 and 3. Clear diffraction patterns are observed, which indicate the high degree of crystallinity of these fibers. In addition, yarns made from these fibers have a high tensile strength and low shrinkage in boiling water, which further indicates good crystallinity.

The copolyamide fibers of the present invention have tensile strengths of at least 3 g./d. and an initial Young's modulus of at least 30 g./d. even after the treatment in the boiling water in the relaxed condition.

The copolyamides of the present invention exhibit the following physical properties which make them useful in fibers.

(i) Drawing ratio can be high

Because the crystallinity is high, the tensile strength of the drawn yarn is also large, the shrinkage in boiling water is low and dimensional stability is excellent.

(ii) The melting point is lower than 265° C.

The copolyamides have melting points of 200–265° C., preferably 260–200° C. easily melt polymerize and melt spin.

The copolyamides of this invention are synthesized by methods similar as those employed to synthesis the prior art aliphatic polyamide, such Nylon 66. Namely, paraxylylene dodecane·dioic acid amide, metaxylylene dodecane·dioic acid amide and hexamethylene dodecane·dioic acid amide are mixed in the following weight ratio:

(a) 45–90% by weight of paraxylylene dodecane·dioic acid amide
(b) 10–45% by weight of metaxylylene dodecane·dioic acid amide and
(c) 0–45% by weight of hexamethylene dodecane·dioic acid amide with the sum of (a) (b) and (c) being 100.

More preferably, the polyamide composition is within the following weight ratio:

(a) 45–80% by weight of paraxylylene dodecane·dioic acid amide
(b) 10–45% by weight of metaxylylene dodecane·dioic acid amide
(c) 10–45% by weight of hexamethylene dodecane·dioic acid amide with the sum of (a), (b) and (c) being 100.

The nylon salts are blended in a reactor, to which water and a viscosity control agent are added as required. The reaction is conducted under pressure in an inert gas atmosphere such as nitrogen or carbon dioxide. It is preferable to limit the reaction temperature to no more than 300° C. in order to avoid gelation. However, it is possible to raise the polymerization temperature at the final stage of the polymerization to more than 300° C. in order to facilitate the extrusion of the polymer from the reactor. In some cases it is of advantage to carry out the later stages of the polymerization reaction under a reduced pressure in order to limit the degree of the polymerization. In the present invention, generally a polymer having the inherent viscosity of 0.60–1.50 is utilized. When the polycondensate is melt spun by conventional methods, filaments having good drawability are obtained. A melt spinning temperature below 320° C. is generally used in order to avoid the undesired discoloration of the product.

The drawing of the filaments is normally carried out over a pin and/or a plate heated at a temperature of at least 50° C. The filaments are drawn to at least 2 times, preferably 3–7 times, their original length.

Because the filaments have sufficiently large crystallization speeds, the phenomenon of "superdraw" is not observed during the drawing. The drawn filaments have good dimensional stability, high tensile strength, high initial Young's modulus and relatively good dyeability with acid dyestuffs.

As compared with Nylon 6 and Nylon 66, the polyamides of this invention have good chemical resistance, little hygroscopic properties and the fiber properties in the wet state are excellent.

Because of these characteristics, when the fiber of the present invention are employed in knitted goods or woven fabrics the knitted goods or woven fabrics exhibit good dyeability, an excellent dimensional stability and a high modulus of bending. When the fibers of this invention are used in textured yarn or as a conjugate fiber with other polyamide fiber, such as Nylon 6 and Nylon 66, high bulky yarns are obtained. The fibers in the form of filaments and staple, are also useful in clothing, interior goods, beddings, carpeting and industrial yarns and fabrics such as tire cord.

The present invention is further illustrated by the following examples.

The physical properties of the copolyamides were measured by the following methods:

(i) Inherent viscosity

The polymer was dissolved in concentrated sulfuric acid so that the concentration of the polymer was adjusted to 0.5%. The inherent viscosity was measured at 30° C.

(ii) Melting point

A small piece of the polymer was heated under a polarization microscope equipped with a heating plate. The melting point was taken as temperature at which polarized light disappeared.

(iii) Shrinkage in boiling water

A sample yarn in a relaxed state was boiled in water for 30 minutes. The length of the yarn before and after the treatment was measured under a load of 50 mg./d. and the degree of shrinkage was calculated.

(iv) Initial Young's modulus

A sample yarn conditioned at a temperature of 20° C. and relative humidity of 65% was pulled at a tensile speed of 100%/min. to depict a stress-strain curve. The initial Young's modulus was obtained from the gradient of the initial part of said curve.

EXAMPLE 1

To 50 parts of paraxylylene dodecane·dioic acid amide salt and 50 parts of metaxylylene dodecane·dioic acid amide salt, 0.2 part of benzoic acid was added as a viscosity control agent. The mixture was mixed and charged in an autoclave. The air inside was evacuated and replaced with nitrogen. The autoclave was sealed and heated to 260° C. The pressure was controlled at 10 kg./cm.$^2$. After 2 hours, the pressure was released over a 2 hour period. The autoclave was maintained at 260° C. under atmospheric pressure for an additional 2 hours to complete the polymerization. The resultant copolymer was crystalline and had an inherent viscosity of 0.84 and a melting point of 216° C.

The copolymer was extruded through a spinneret at a spinning temperature of 240° C. The extruded filaments were drawn to 5 times their original length over a hot plate at 180° C. The drawn filament had a tensile strength of 6.0 g./d., an elongation of 19.6%, an initial Young's modulus of 53 g./d., and a shrinkage in boiling water of 8.3%. The composition of the copolymer prepared in this example is defined by the point "a" in FIG. 1. The wide angle X-ray diffraction photograph of the filament is shown in FIG. 3. The X-ray diffraction pattern is different from what would be expected from a study of X-ray diffraction pattern of a paraxylylene dodecane·dioic acid amide fiber, and the X-ray diffraction pattern of metaxylylene dodecane·dioic acid amide fiber. The X-ray photograph of the novel fiber shows that it has a very high crystallinity.

EXAMPLE 2

In accordance with the procedure in Example 1, a copolymer wherein the ratio of nylon salts of dodecane·dioic acid amide/metaxylylene dodecane·dioic acid amide being 70/30 was synthesized. The polymer was highly crystalline, having a melting point of 235° C. and an inherent viscosity of 1.05. The copolymer was melt spun at 280° C. and the filaments were drawn to 4 times the original length over a hot plate at 180° C. The drawn yarn had a tenacity of 3.1 g./d., an elongation of 14%, an initial Young's modulus of 44 g./d. and a shrinkage in boiling water of 9.6%. The composition of said yarn is shown by a point "b" in FIG. 1.

EXAMPLE 3

In accordance with the procedure in Example 1, a copolymer wherein the ratio of nylon salts of dodecane·dioic acid amide/metaxylylene dodecane·dioic acid amide/hexamethylene dodecane·dioic acid amide was 50/20/30 was synthesized. This copolyamide also was good in crystallinity, having a melting point of 222° C. and an inherent viscosity of 0.98. The copolymer was melt spun at 250° C. and the filaments were drawn to 4 times the original length over a hot plate at 180° C. The drawn yarn had a tenacity of 6.6 g./d., an elongation of 23.3%, an initial Young's modulus of 46 g./d. and a shrinkage in boiling water of 8.0%. The composition of this copolymer is shown by a point "c" in FIG. 1.

FIG. 2 is a wide angle X-ray diffraction photograph of the drawn yarn which shows a good crystallinity.

EXAMPLE 4

To 75 parts of paraxylylene dodecane·dioic acid amide salts, 12.5 parts of metaxylylene dodecane·dioic acid amide salt and 12.5 parts of hexamethylene dodecane·dioic acid amide salt, 0.2 part of benzoic acid was added as a viscosity control agent and 66 parts of water. The mixture was blended and charged into an autoclave. The air inside was evacuated and replaced with nitrogen. Thereafter the autoclave was heated to 285° C. The pressure was maintained at 10 kg./cm.$^2$ for 2 hours, and then released and reaction continued at atmospheric pressure for an additional hour. The autoclave was then heated to 285° C. for 2 more hours to complete the polymerization and the polymer was extruded. The polymer was highly crystalline and had a melting point of 249° C. and an inherent viscosity of 0.80.

The polymer was extruded through a spinneret having six 0.3 mm. orifices at 275° C. The filaments were drawn to 4.5 times the original length over a pin at 70° C. and a hot plate at 150° C. The drawn yarn was 30 denier and had a tensile strength of 4.8 g./d., an elongation of 21%, an initial Young's modulus of 44 g./d. and a shrinkage in boiling water of 8.9%. The filament exhibited good dimensional stability. The composition of this polymer is shown by a point "d" of FIG. 1.

EXAMPLE 5

A copolymer consisting of 80 parts of dodecane·dioic acid amide salt and 20 parts of metaxylylene dodecane·dioic acid amide salt was copolymerized by the polymerization method described in Example 4. The copolymer had good crystallinity, a melting point of 251° C. and an inherent viscosity of 0.68.

The copolymer was melt spun as in Example 4 at 278° C. to obtain 6-filament yarn that was drawn to 4.5 times the original length over a hot pin at 70° C. and a hot plate at 150° C. This drawn yarn was 40 denier, had a tensile strength of 4.8 g./d., an elongation of 18.2%, an initial Young's modulus of 53 g./d. and a shrinkage in boiling water of 8.9%. The composition of this copolymer was shown by a point "e" in FIG. 1.

EXAMPLE 6

By the method described in Example 1, a copolymer comprised of paraxylylene dodecane·dioic acid amide/metaxylylene dodecane·dioic acid amide/hexamethylene dodecane·dioic acid amide in the ratio of 65/15/20 was synthesized. This copolymer also had good crystallinity, a melting point of 238° C. and an inherent viscosity of 0.83. The copolymer was melt spun at 250° C. into filaments, that were drawn to 5.5 times the original length over a hot pin at 70° C. and a hot plate at 150° C. The drawn yarn had a tenacity of 5.1 g./d., an elongation of 13.5%, an initial Young's modulus of 52 g./d. and a shrinkage in boiling water of 7.4%. The composition of this copolymer was shown by a point "f" in FIG. 1.

EXAMPLE 7

By the method described in Example 1, a copolymer of the nylon salts of paraxylylene dodecane·dioic acid amide/metaxylylene dodecane·dioic acid amide/hexamethylene dodecane·dioic acid amide in the ratio of 50/35/15 was synthesized. The copolymer also had good crystallinity, a melting point of 224° C., an inherent viscosity of 0.70. The copolymer was melt spun at 240° C. into filaments which were drawn to 5.0 times the original length over a hot pin at 70° C. and a hot plate at 150° C. to obtain a drawn yarn having a tenacity of 3.8 g./d., an elongation of 13.8%, an initial Young's modulus of 51 g./d. and a shrinkage in boiling water of 7.9%. The composition of this copolymer is shown by a point "g" in FIG. 1.

EXAMPLE 8

By the method described in Example 1, copolymers wherein the mixing ratios of the nylon salts of paraxylylene dodecane·dioic acid amide/metaxylylene dodecane·dioic acid amide was 40/60 and 30/70 were synthesized. These copolymers had good crystallinity, however, their melting points were 192° C. and 182° C., that were too low for the object of utilizing as a useful synthetic fiber. These compositions are shown by points "h" and "i" in FIG. 1 which are outside of the triangle ABC.

EXAMPLE 9

By the method disclosed in Example 1, a copolymer wherein the mixing ratio of the nylon salts of paraxylylene dodecane·dioic acid amide/metaxylylene dodecane·dioic acid amide/hexamethylene dodecane·dioic acid amide was 30/40/30 was synthesized. The copolymer had an inherent viscosity of 0.70 and a melting point of 200° C. Because it had low crystallinity and a low melting point, the copolymer was unsuitable for fibers of the present invention. The composition of this copolymer is shown by a point "j" in FIG. 1 which is outside the triangle ABC.

EXAMPLE 10

By the method described in Example 1, a copolymer wherein the mixing ratio of the nylon salts of paraxylylene dodecane·dioic acid amide/hexamethylene dodecane·dioic acid amide was 50/50 was synthesized. The copolymer had a melting point of 225° C. and an inherent viscosity of 1.00. The copolymer was melt spun at 260° C. into filaments that were drawn to 5.0 times the original length over a hot plate at 180° C. to obtain a drawn yarn having a tenacity of 6.0 g./d., an elongation of 20%, an initial Young's modulus of 41 g./d. and a shrinkage in boiling water of 8.2%. The composition of this copolymer is shown by a point k in FIG. 1. When the properties of this drawn yarn were compared with a yarn of the terpolymer containing metaxylylene dodecane·dioic acid amide and a yarn of a copolymer of paraxylylene dodecane·dioic acid amide/metaxylylene dodecane·dioic acid amide, despite the fact that all the yarns were drawn yarns under almost the same drawing conditions, it was found that the values of the initial Young's modulus became smaller in the sequence of paraxylylene dodecane·dioic acid amide/metaxylylene dodecane·dioic acid amide greater than paraxylylene dodecane·dioic acid amide/metaxylylene dodecane·dioic acid amide/hexamethylene dodecane·dioic acid amide greater than paraxylylene dodecane·dioic acid amide/hexamethylene dodecane·dioic acid amide. This clearly showed that when the metaxylylene dodecane·dioic acid amide component is present, yarns having a higher initial Young's modulus are obtained.

The following is claimed:

1. The fiber-forming copolyamide consisting essentially of 45–80% by weight of paraxylylene dodecane dioic acid amide units, 10–45% by weight of metaxylylene dodecane dioic acid amide units and 10–45% by weight of hexamethylene dodecane dioic acid amide units.

2. The fiber of the copolyamide according to claim 1.

References Cited

UNITED STATES PATENTS

| 3,012,994 | 12/1961 | Bell et al. | 260—78 |
| 3,475,387 | 10/1969 | Carter et al. | 260—78 |

FOREIGN PATENTS

| 766,927 | 1/1957 | Great Britain | 260—78 |

OTHER REFERENCES

Carlston et al.: Industrial and Engineering Chemistry, vol. 49, No. 8 (August 1957), pp. 1239–40.

HAROLD D. ANDERSON, Primary Examiner

U.S. Cl. X.R.

57—140 R; 161—169; 260—30.8 R, 78 S; 264—210 F